(12) United States Patent
Schillings et al.

(10) Patent No.: US 10,569,513 B2
(45) Date of Patent: Feb. 25, 2020

(54) FIRE-RETARDANT COATING

(71) Applicant: SCHILLINGS GMBH & CO. KG, Viersen (DE)

(72) Inventors: Hans Schillings, Viersen (DE); Eric Schillings, Viersen (DE)

(73) Assignee: SCHILLINGS GMBH & CO. KG (DE)

( * ) Notice: Subject to any disclaimer, the term of this patent is extended or adjusted under 35 U.S.C. 154(b) by 20 days.

(21) Appl. No.: 15/888,518

(22) Filed: Feb. 5, 2018

(65) Prior Publication Data
US 2018/0236754 A1 Aug. 23, 2018

(30) Foreign Application Priority Data

Feb. 17, 2017 (EP) ..................... 17156613

(51) Int. Cl.
*B32B 27/12* (2006.01)
*B32B 5/02* (2006.01)
(Continued)

(52) U.S. Cl.
CPC .............. *B32B 27/12* (2013.01); *B32B 5/022* (2013.01); *B32B 5/024* (2013.01); *B32B 5/028* (2013.01); *B32B 27/36* (2013.01); *E04B 1/80* (2013.01); *E04B 1/942* (2013.01); *E04C 2/243* (2013.01); *E04C 2/246* (2013.01); *B32B 2262/101* (2013.01); *B32B 2307/304* (2013.01); *B32B 2307/3065* (2013.01); *B32B 2307/718* (2013.01); *B32B 2419/00* (2013.01); *E04B 1/762* (2013.01); *Y10T 428/27* (2015.01)

(58) Field of Classification Search
CPC ......... B32B 27/12; B32B 5/024; B32B 5/028; B32B 27/36; B32B 5/022; B32B 2307/304; B32B 2307/3065; B32B 2419/00; B32B 2262/101; B32B 2307/718; E04C 2/243; E04C 2/246; E04B 1/942; E04B 1/80; E04B 1/762; Y10T 428/27

See application file for complete search history.

(56) References Cited

U.S. PATENT DOCUMENTS 6,855,393 B1    2/2005  Ayres
2014/0329079 A1* 11/2014  Liu ........................ B32B 5/18
                                                    428/317.1
(Continued)

FOREIGN PATENT DOCUMENTS

DE    202012013058 U1 *  8/2014  ............. E04C 2/243
GB    2290989 A           1/1996
WO    WO-2012076905 A1 *  6/2012  ............. B32B 27/12

OTHER PUBLICATIONS

[NPL-1] Faotto [DE202012013058 U1]; (EPO—machine translation to English). (Year: 2014).*

(Continued)

*Primary Examiner* — David Sample
*Assistant Examiner* — Donald M Flores, Jr.
(74) *Attorney, Agent, or Firm* — Dilworth IP, LLC

(57) ABSTRACT

The present application relates to a multilayer heat insulation board for thermal insulation for buildings, a back layer for a heat insulation board, a process for preparing a back layer, and the use of a multilayer heat insulation board for thermal insulation for buildings, especially for thermal insulation for ventilated facades.

16 Claims, 2 Drawing Sheets

(51) Int. Cl.
*B32B 27/36* (2006.01)
*E04B 1/80* (2006.01)
*E04B 1/94* (2006.01)
*E04C 2/24* (2006.01)
*E04B 1/76* (2006.01)

(56) References Cited

U.S. PATENT DOCUMENTS

2015/0352806 A1* 12/2015 Faotto .................... E04C 2/243
  428/323
2017/0022704 A1* 1/2017 Bertucelli ............... E04B 1/942

OTHER PUBLICATIONS

Search Report dated Sep. 21, 2017 issued by the European Patent Office in corresponding EP Application No. 17 15 6613.6, 8 pages.

* cited by examiner

FIRE-RETARDANT COATING

The present application relates to a multilayer heat insulation board for thermal insulation for buildings, a back layer for a heat insulation board, a process for preparing a back layer, and the use of a multilayer heat insulation board for thermal insulation for buildings, especially for thermal insulation for ventilated facades.

Multilayer heat insulation boards are widely applied in building construction, for example, in order to ensure the heat insulation of walls, floors and roofs. Such insulation boards for constructions of the known type generally have an insulation layer prepared, for example, from polyurethane foam, sandwiched between two respective back layers suitable for cladding this insulation layer. Such back layers play a dual role: On the one hand, they absorb the expansion of the polyurethane foam, and on the other hand, they provide these boards with a predefined shape and thickness, at the same time ensuring dimensional stability.

There are different approaches and materials for preparing heat insulation boards. Materials known in the prior art that are employed for back layers of polyurethane insulation boards include, for example, mineralized glass fibers, or metallic layers made of aluminum, for example.

The use of a wide variety of back layer materials also has an influence on flexibility, depending on the thickness and composition thereof. This is of importance because the back layers should be capable of being bent and/or wound.

Heat insulation boards for buildings comprising back layers are usually classified into Euroclasses.

These building material Euroclasses are distinguished with letters, such as A1, A2, B, C, D, E and F. Further subclasses define fire side effects, such as smoke (s) development (classes s1, s2 and s3), or flaming droplets/particles (d=droplets, classes d0, d1 and d2), of building materials.

Class E defines the minimum requirement for German/European building materials. Class B defines a high degree of fire resistance. Class F means that the building material is highly inflammable and therefore represents the worst classification.

For example, insulation boards of polyurethane with back layers of the metallic type (such as aluminum) having a thickness of more than 80 µm fall into fire resistance class B.

A known test used for evaluating the Euroclasses of a polyurethane board is the UNI EN 11925 method (small ignition flame). The duration of this test varies as a function of the classification of the material: 15 seconds for class E, 30 seconds for the higher classes. For the test to be passed, the height of a flame generated at a test specimen must remain below a threshold of 150 mm.

For example, the boards having a lower performance (class F) are those using back layers of paper (tar paper, felt paper etc.). Therefore, these boards are unsuitable for building material uses, because there is always a risk of direct contact with the flames in the initial stages of the fire (insulation of floors below screeds or boundary spaces).

Generally, for a polyurethane insulation board to be classified into fire resistance classes A1, A2, B, C or D according to the standard EN 13501-11925/2, back layers of the insulation boards of the metallic type have to be applied (such as aluminum layers having a thickness of more than 80 µm) [for the test according to DIN EN 13501-1 classes A1, A2, B, C or D, a test according to DIN EN 11925-2 (small ignition flame test) is performed first, followed by performing an SBI test according to DIN EN 13823, depending on the class to be determined].

DE 20 2012 013 058 U1 relates to a back layer of a multilayer building heat insulation board having a reinforcing layer of fiber material, a cladding layer of the reinforcing layer prepared by distributing a liquid mineral mixture on the reinforcing layer, and a fire-resistant layer having expandable graphite provided on the cladding layer.

U.S. Pat. No. 6,855,393 B1 discloses a back layer of a multilayer building heat insulation board. Further, U.S. Pat. No. 6,855,393 B1 discloses a main layer of thermally insulating material, namely an aluminum foil, that has a first surface and a second, opposite surface; a first back layer on the main layer bonded to the main layer along the first surface, a second back layer of the main layer bonded to the main layer along the second surface; wherein at least one of said first and second back layers has a reinforcing layer of fiber material, a cladding layer prepared on said reinforcing layer, and a fire-resistant layer provided on the cladding layer and having expandable graphite. The fire-resistant intumescent layer is provided on the cladding layer.

GB 2 290 989 discloses the use of a solution with silicates which, when coated, are supposed to yield a silicate coat on the surface of the product in order to ensure fire resistance of an otherwise inflammable product.

The heat insulation boards of the present invention have excellent flame retardant properties, and therefore, they may be employed, in particular, when the fire regulations require a hardly inflammable insulation layer, or a hardly inflammable cover layer is to protect a product from fire propagation. In addition, the heat insulation boards of the invention represent an inexpensive and lighter alternative to heat insulation boards having metallic cover layers of aluminum or steel with a high material thickness, or back layers made of metals.

The heat insulation boards of the invention may be, for example, polyurethane heat insulation boards equipped with the back layers according to the invention that can achieve building material class B1 according to DIN 4102-1, or fall into class B or C according to DIN EN 13501-1.

It is the object of the present invention to solve the problems mentioned in the prior art. In particular, the multilayer heat insulation board for thermal insulation according to the present invention is especially advantageous and suitable for ventilated facades. Ventilated facades may cause problems because of a chimney effect caused in the event of a fire, requiring a particularly effective fire protection. As compared to the prior art, for example, DE 20 2012 013 058 U1, the subject matter according to the invention has the advantage that the mineral coating is opposite the fire protection coating on the other side of the glass fiber mat. The side facing the foam is thereby separated and decoupled from the fire protection layer. This arrangement even improves fire protection because the lower propagated temperature has the effect that the PU foam does not expand within a particular period of time, which prevents the cover layer from cracking.

Another advantage of this arrangement according to the invention is the PU-friendly mineral coating that prevents negative reactions on the foaming PU mixture and causes a uniform closed surface of the insulation foam.

Surprisingly, it has been found that the problems previously mentioned in the prior art can be solved by the subject matter of the present invention.

The present invention relates to a multilayer heat insulation board for thermal insulation for buildings, comprising:
 a) a main layer of thermally insulating organic-polymeric material having a first major surface and a second major surface opposite said first major surface;

b) a reinforcing layer having a first major surface and a second major surface opposite said first major surface, wherein said reinforcing layer is bonded to the main layer along the first major surface of the main layer and along the first major surface of the reinforcing layer, and wherein said reinforcing layer contains inorganic salts in a quantity of at least 50% by weight, based on the total weight of the reinforcing layer;

c) a decoupling layer having a first major surface and a second major surface opposite said first major surface, wherein said decoupling layer is provided on and bonded to the second major surface of the reinforcing layer with the first major surface of the decoupling layer, wherein said decoupling layer comprises one or more fibers and/or non-wovens selected from the group consisting of glass-fiber mat, polyester non-woven, glass fabric mat, glass scrim mat, and glass fiber/polyester blend non-woven; and d) a fire-protection layer provided on and bonded to the second major surface of the decoupling layer (30), said fire-protection layer containing expandable graphite.

Major surfaces are those surfaces of the layers that are largest in area. For example, in a writing paper sheet, the front and back sides of the writing areas of the sheet form the major surfaces, and the edge surfaces of the paper form the minor surfaces.

The multilayer heat insulation board according to the invention includes at least the previously mentioned layers, i.e., the main layer a), the reinforcing layer b), the decoupling layer c), and the fire-protection layer d), wherein said reinforcing layer, decoupling layer and fire-protection layer together form a back layer according to the invention that can be applied to a main layer a) to form a heat insulation layer according to the invention.

Main Layer

The main layer a) of the multilayer heat insulation board essentially serves for heat insulation and consists of or comprises a thermally insulating organic-polymeric material. In a preferred embodiment, the heat insulation board comprises a main layer that essentially has one or more organic polymer(s). In one embodiment, the main layer a) comprises at least 50% by weight, preferably at least 70% by weight, more preferably at least 80% by weight, particularly at least 90% by weight, especially at least 95% by weight, more especially at least 98% by weight, for example, at least 99% by weight or from 99.5% to about 100% by weight, of organic polymer, wherein the stated weight percentages are respectively based on the total weight of main layer a).

In a preferred embodiment, the main layer a) that consists of or comprises a thermally insulating organic-polymeric material is selected from the group consisting of polyurethane, polyisocyanurate, polystyrene and phenol resin, and mixtures thereof.

It has been found that, in particular, foamed thermally insulating organic polymer layers are excellently suitable in cooperation with the further layers of the subject matter according to the invention. This holds not only in view of the improved heat insulation properties and the light weight of the material, but also, in particular, for the fire-protection properties.

In another preferred embodiment of the invention, the main layer is foamed.

Particularly good results can be achieved if the main layer a) comprises a foamed polyurethane and/or polyisocyanurate.

The multilayer heat insulation board of the present invention is preferably embodied as a flat and essentially rigid plate. This facilitates the buildability, especially in the fire protection insulation of facades, ceilings and walls.

Therefore, in a preferred embodiment, the multilayer heat insulation board is embodied as a heat insulation board with respect to the main layer. Such boards usually have front and back sides, which form the major surfaces, and a circumferential edge. The average distance between the two major surfaces of the board defines the thickness of the board.

In particular, the main layer a) is embodied as an insulation board having a thickness of from 1 to 20 cm, preferably from 2 to 15 cm, especially from 3 to 10 cm.

The main layers a) employed according to the invention preferably have a thermal conductivity below 0.035 W/mK, preferably between 0.01 and 0.03 W/mK.

Reinforcing Layer

The multilayer heat insulation layer according to the invention has a reinforcing layer b). The reinforcing layer also has a first major surface and a second major surface opposite said first major surface. The first major surface of the reinforcing layer b) is provided directly on the first major surface of the main layer in direct contact with it. The reinforcing layer contributes to the reinforcement of the multilayer heat insulation layer and additionally leads to a significantly improved compatibility of the fire-protection coating with the organic-polymeric material of the main layer a).

The reinforcing layer mainly contains inorganic salts preventing negative reactions with the main layer, especially when the main layer is foamed, such as foamed polyurethane or polyisocyanurate, and leads to a uniform closed surface of the polymeric foam of the main layer.

The reinforcing layer b), which is bonded to the first major surface of the main layer, contains inorganic salts in an amount of at least 50% by weight, based on the total weight of the reinforcing layer.

In a preferred embodiment, the reinforcing layer contains inorganic salts in an amount of from 50 to 98% by weight, preferably from 60 to 95% by weight, more preferably from 70 to 94% by weight, especially from 75 to 90% by weight, respectively based on the total weight of the reinforcing layer.

In a preferred embodiment, the reinforcing layer comprises alkaline earth metal salts, especially the salts selected from the group consisting of magnesium salts, calcium salts, barium salts, and mixtures thereof. Alkaline earth metal salts, especially those having oxygen atoms in their anions, have proven particularly effective for the reinforcing layer to be employed according to the invention. More preferably, the reinforcing layer comprises salts selected from the group consisting of sulfates, hydrogensulfates, carbonates, hydrogencarbonates, hydroxides and oxides, and mixtures thereof. For example, the reinforcing layer (20) comprises one or more inorganic salts selected from the group consisting of calcium carbonate and barium sulfate, and mixtures thereof. More preferably, limestone meal is employed for the reinforcing layer.

Within the scope of the present invention, the reinforcing layer may contain metal hydroxides. In a preferred embodiment, such metal hydroxides are present in addition to the above mentioned inorganic salts. In a specific embodiment, the reinforcing layer contains aluminum hydroxide. It has been found that the use of aluminum hydroxide, especially in addition to further inorganic salts, such as calcium carbonate or barium sulfate, results in improved fire protection.

In one embodiment, the reinforcing layer contains from 1.5 to 20% by weight, preferably from 2 to 18% by weight, more preferably from 5 to 15% by weight, especially from 8 to 12% by weight, of aluminum hydroxide (Al(OH)$_3$), the stated weight percentages being respectively based on the total weight of the reinforcing layer. Advantageously, the reinforcing layer contains aluminum hydroxide having a bulk density of from 600 to 800 kg/m$^3$ as measured according to ISO 903. In this bulk density range, a further reinforcement of the fire protection can be seen. The fire protection can also be further advantageously influenced if the specific surface area of the aluminum hydroxide is specifically adjusted. An aluminum hydroxide with a specific surface area (BET) of from 1.5 to 3.0 m$^2$/g as measured according to DIN 66132 has proven particularly suitable.

In a specific embodiment, the reinforcing layer contains aluminum hydroxide with a mean particle diameter of from 8 to 14 μm as measured according to ISO 13320-1. Such aluminum hydroxides are commercially available, for example, under the designation Reflamal® S3 of the company DADCO.

The multilayer heat insulation board of the present invention has a reinforcing layer that preferably has a base weight of from 200 to 400 g/m$^2$, especially from 250 to 350 g/m$^2$.

Preferably, the reinforcing layer to be employed according to the invention additionally comprises an organic polymeric binder material, preferably a binder selected from the group consisting of styrene/butadiene binder, styrene/acrylate binder, and vinyl acetate/ethylene copolymer binder. Preferably, the binder (binder material) is present in the reinforcing layer in an amount of from 1 to 12% by weight, preferably from 2 to 10% by weight, more preferably from 3 to 8% by weight, and especially from 4 to 6% by weight, respectively based on the total weight of the reinforcing layer.

It has been found that the reinforcing layer reinforces the heat insulation board according to the invention not only with respect to its stiffness, but additionally provides for a reduced shrinkage and a reduced waviness of the heat insulation board.

Decoupling Layer

Another component of the multilayer heat insulation board of the present invention is a decoupling layer c). The decoupling layer has a first major surface and a second major surface opposite said first major surface. The decoupling layer with its first major surface is provided on and bonded to the second major surface of the reinforcing layer. The decoupling layer c) comprises one or more fibers and/or non-wovens selected from the group consisting of glass-fiber mat, polyester non-woven, glass fabric mat, glass scrim mat, and glass fiber/polyester blend non-woven.

In a preferred embodiment of the invention, the decoupling layer has glass fibers or a glass fiber mat, the thickness of the fibers preferably being more than 8 μm, especially from 12 to 20 μm. The thickness of the fibers is of particular advantage within the scope of the present invention because an ideal mutual distance between the fibers can be produced thereby.

Advantageously, the decoupling layer has a base weight of from 30 to 100 g/m$^2$, preferably from 40 to 90 g/m$^2$, especially from 50 to 80 g/m$^2$.

In a preferred embodiment, the decoupling layer has a glass fiber/polyester blend non-woven containing from 5 to 45% by weight, preferably from 10 to 30% by weight, of polyester fibers.

The decoupling layer is provided between the reinforcing layer and the fire-protection layer and is preferably bonded to either or both of them.

The side facing the main layer, preferably the polymer foam, is thereby separated and decoupled from the fire-protection layer. This specific arrangement improves fire protection since the lower propagated temperature has the effect that the main layer, which comprises organic-polymeric material, does not expand within a short period of time, which could lead to cracking of the back layer comprising the reinforcing layer, decoupling layer and fire-protection layer.

Fire-Protection Layer

Another essential component of the multilayer heat insulation board of the present invention is a fire-protection layer. The fire-protection layer is completely or partially provided on and bonded to the second major surface of the decoupling layer. The fire-protection layer contains expandable graphite. The fire-protection layer usually forms one of the outer layers of the multilayer heat insulation board, and therefore is not coated with any other layer, or in contact with any other layer (except for the decoupling layer).

It has been found that expandable graphite forms an extremely effective fire protection for the multilayer heat insulation board of the present invention, especially in combination with the other layers of the heat insulation board. The amount of the expandable graphite is to be adjusted to an optimum extent. In a preferred embodiment, the fire-protection layer contains expandable graphite in an amount of from 10 to 80% by weight, or from 20 to 60% by weight, preferably from 30 to 50% by weight, especially from 40 to 50% by weight, respectively based on the total weight of the fire-protection layer.

Surprisingly, it has been found that mixtures of expandable graphite showing different particle sizes cause an improved fire protection, especially with respect to the expanded foam formed from the expandable graphite. In a preferred embodiment, the fire-protection layer contains expandable graphite (A) having a mean particle size D50<150 μm and expandable graphite (B) having a mean particle size D50 of from 180 to 500 μm. The mixtures of expandable graphite (A) and expandable graphite (B) can additionally be further optimized in terms of their mixture ratios, in order to achieve improved results with respect to the fire protection of the multilayer heat insulation boards. In a preferred embodiment of the heat insulation board according to the invention, the fire-protection layer contains the above mentioned expandable graphite (B) and expandable graphite (A) in a weight ratio of expandable graphite (B) to expandable graphite (A) of >1, preferably within a range of from 2:1 to 15:1, especially from 3:1 to 10:1, specifically from 4:1 to 8:1. In one embodiment of the invention, the graphite (B) is present in an amount of from 10 to 70% by weight, preferably from 15 to 60% by weight, more preferably from 20 to 50% by weight, respectively based on the total weight of the fire-protection layer. In another preferred embodiment, the expandable graphite (A) is present in an amount of from 1 to 20% by weight, preferably from 2 to 15% by weight, especially from 3 to 10% by weight, respectively based on the total weight of the fire-protection layer (40).

The fire-protection layer may contain further components to improve the fire protection properties. In a preferred embodiment, the fire-protection layer contains a polyphosphate, preferably ammonium polyphosphate, especially in an amount of from 5 to 25% by weight, especially from 10 to 20% by weight, respectively based on the total weight of the fire-protection layer.

In another embodiment, the fire-protection layer additionally contains cyanurates. In a specific embodiment, the fire-protection layer contains melamine cyanurate, preferably in an amount of from 1 to 10% by weight, more preferably from 2 to 8% by weight, especially from 2.5 to 6% by weight, respectively based on the total weight of the fire-protection layer.

Surprisingly, it has been found that a stabilization of the expanded graphite foam can be achieved by using the above mentioned cyanurates, especially melamine cyanurate, and/or the polyphosphates especially ammonium polyphosphate (APP). When these are used, the graphite foam has a firmer consistency and cannot be swept away by an air current. This causes an advantageous fire protection, because the foam is distributed more firmly on the surface and more effectively prevents the flames from intruding.

In addition, the fire-protection layer may contain china clay. The use of china clay enhances the flame-retardant effect. In addition, the china clay enhances the processability when the fire-protection layer is applied. In a preferred embodiment, the fire-protection layer contains china clay, preferably in an amount of from 2 to 20% by weight, more preferably from 4 to 15% by weight, respectively based on the total weight of the fire-protection layer. China clay having a mean particle size D50 within a range of from 5 to 10 µm is particularly suitable for the fire-protection layer.

In a preferred embodiment, the fire-protection layer contains a binder, preferably an organic binder. Particularly suitable are organic-polymeric binders, which more preferably have vinyl acetate monomer units, especially being a vinyl acetate/ethylene copolymer.

Waterproof acrylate or styrene/acrylate binders may also be employed, especially for exterior applications. Since the fire-protection layer usually represents the outer layer of the heat insulation layer, which may also be exposed to weather conditions, it is advantageous for the fire-protection layer to additionally contain hydrophobizing agents.

Generally, polymeric binders have proven particularly suitable for the fire-protection layer whose film properties in terms of tensile strength are below 20 N/mm$^2$, preferably below 10 N/mm$^2$, especially from 1 to 8 N/mm$^2$, as measured according to UNI 8490-17. This enables the fire-protection layer to have sufficient flexibility, preventing the layer from cracking.

In another embodiment of the invention, the fire-protection layer contains polyethylene oxide. The use of polyethylene oxide provides improvements, especially in the processing. When the layer is applied, an improved lubrication effect on the application composition can be achieved by using polyethylene oxide. At the same time, however, the use of polyethylene oxide does not result in a substantial impairment of the fire protection effect. The use of slipping agents, especially polyethylene oxide, can prevent a congestion of graphite particles on the doctor knife when the layer is applied.

Usually, the base weight of the fire-protection coating is adjusted with the expandable graphite to a value by which an optimum fire protection effect can be achieved. Preferably, the base weight is within a range of from 200 to 400 g/m$^2$. For a base weight above 400 g/m$^2$, the risk that cracks are forming during the expansion of the graphite increases. Such cracks cleave a way for the flames in the event of a fire, which is disadvantageous. A base weight lower than 200 g/m$^2$ bears the risk that not enough fire-protection agent might be present in the event of a fire.

The present invention further relates to a process for preparing a back layer for a heat insulation board, comprising the following steps:
i) providing a decoupling layer (30) having a first major surface and a second major surface opposite said first major surface, wherein said decoupling layer (30) comprises one or more fibers and/or non-wovens selected from the group consisting of glass-fiber mat, polyester non-woven, glass fabric mat, glass scrim mat, and glass fiber/polyester blend non-woven, preferably said decoupling layer (30) additionally containing an organic binder;
ii) applying a reinforcing layer (20) to the first major surface of the decoupling layer (30), said reinforcing layer (20) containing inorganic salts in a quantity of at least 50% by weight, based on the dry weight of the reinforcing layer (20);
iii) optionally drying the decoupling layer (30) and the reinforcing layer (20);
iv) applying a fire-protection layer (40) to the second major surface of the decoupling layer (30), said fire-protection layer (40) containing expandable graphite; and
v) optionally drying the decoupling layer (30) and the fire-protection layer (40).

The invention further relates to a back layer, comprising:
a decoupling layer (30) having a first major surface and a second major surface opposite said first major surface, wherein said decoupling layer (30) comprises one or more fibers and/or non-wovens selected from the group consisting of glass-fiber mat, polyester non-woven, glass fabric mat, glass scrim mat, and glass fiber/polyester blend non-woven;
a reinforcing layer (20) applied and bonded to the first major surface of the decoupling layer (30), said reinforcing layer (20) containing inorganic salts in a quantity of at least 50% by weight, based on the total weight of the reinforcing layer (20); and
a fire-protection layer (40) applied and bonded to the second major surface of the decoupling layer (30), said fire-protection layer (40) containing expandable graphite.

The composition and structure of the back layer according to the invention, especially with respect to the decoupling layer, reinforcing layer and fire-protection layer, have been illustrated above in connection with the multilayer heat insulation board according to the invention.

The invention further relates to a process for preparing a multilayer heat insulation board for thermal insulation for buildings according to the present invention, wherein a back layer according to the invention as defined above is provided, and a main layer (10) of a thermally insulating organic-polymeric material is applied to the first major surface of the reinforcing layer (20) and bonded to the reinforcing layer (20).

The present invention further relates to a multilayer heat insulation board for thermal insulation for buildings, comprising a main layer (10) of a thermally insulating organic-polymeric material having a first major surface and a second major surface opposite said first major surface;
a first back layer on the main layer (10), bonded to the main layer (10) along the first major surface of the main layer;
a second back layer on the main layer (10), bonded to the main layer (10) along the second major surface of the main layer, wherein said first and/or second back layers is/are a back layer as defined above.

In a preferred embodiment, the multilayer heat insulation board for thermal insulation for buildings comprises a main layer (10) of a thermally insulating organic-polymeric material having a first major surface and a second major surface opposite said first major surface;

a first back layer on the main layer (10), bonded to the main layer (10) along the first major surface of the main layer and along the first major surface of the reinforcing layer;

a second back layer on the main layer (10), bonded to the main layer (10) along the second major surface of the main layer and along the first major surface of the reinforcing layer, wherein said first and second back layers are back layers according to the invention as defined above.

The multilayer heat insulation boards according to the invention have a wide variety of applications, especially for thermal insulation in buildings. Therefore, the invention further relates to the use of a multilayer heat insulation board according to the invention for thermal insulation for buildings, especially for thermal insulation for ventilated facades.

Figure 1:
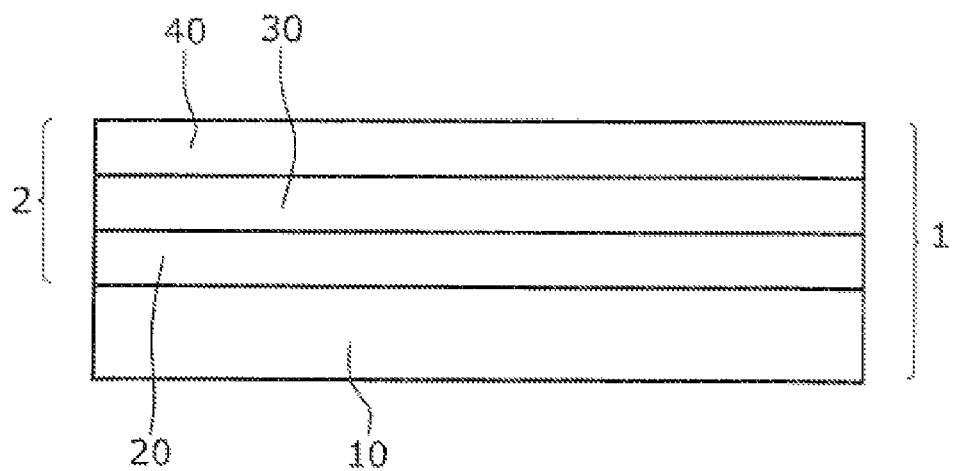
FIG. 1 shows a multilayer heat insulation board (1) according to the invention provided on one side thereof with a back layer (2). The heat insulation board (1) has the main layer (10), the reinforcing layer (20), the decoupling layer (30), and the fire-protection layer (40).
Figure 2:
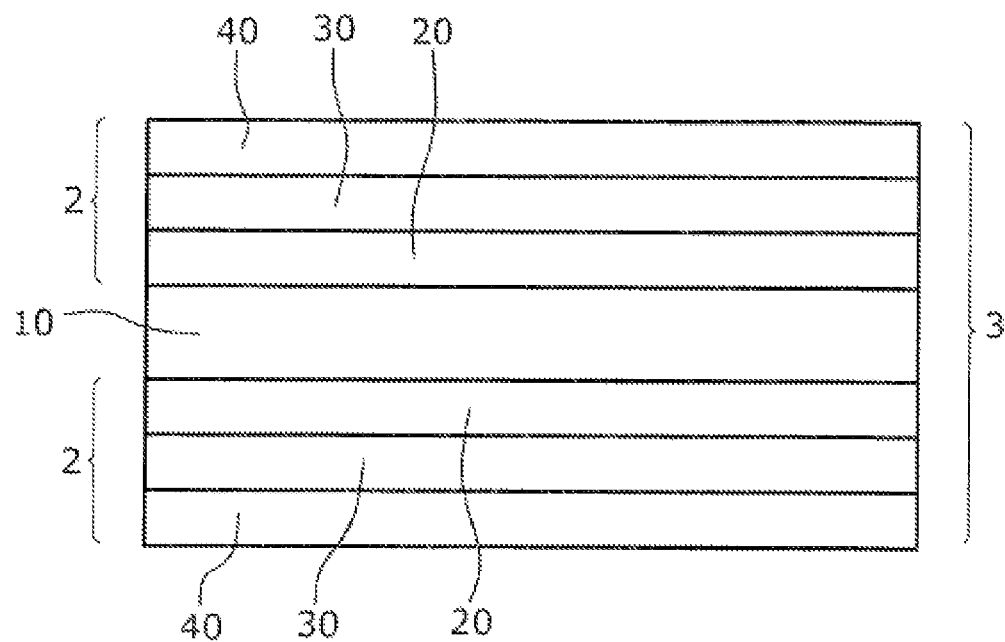
FIG. 2 shows an alternative multilayer heat insulation board (1) with 2 back layers (2), each of which having a reinforcing layer (20), a decoupling layer (30), and a fire-protection layer (40) that is provided on the respective outside, wherein each of the main layers (10) are in contact with and bonded to the reinforcing layers (20).
Figure 3:
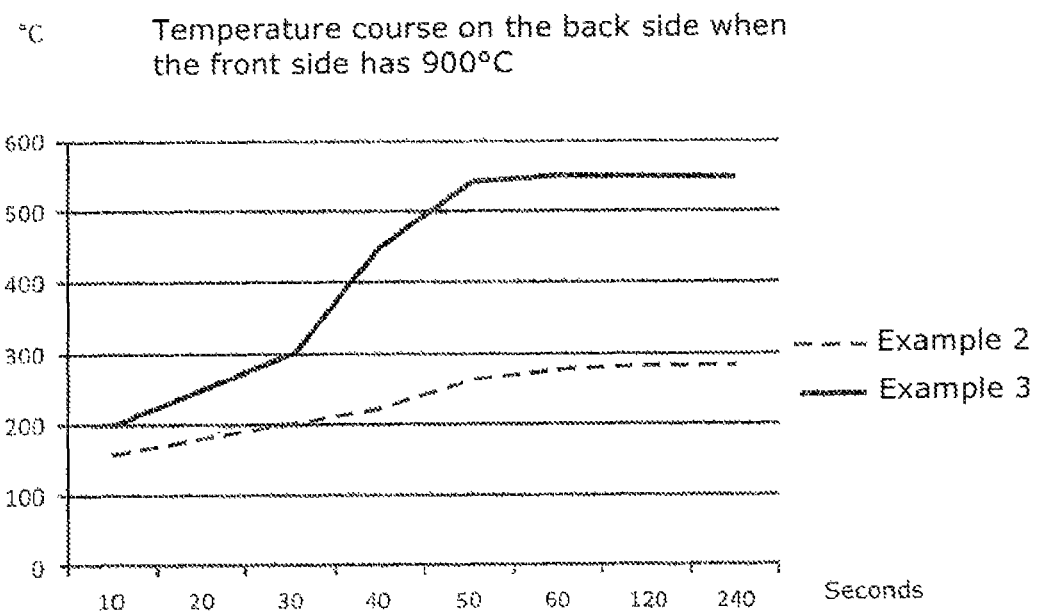
FIG. 3 shows the temperature course on the back side of the back layer (on the reinforcing layer) according to Example 2 (dashed line) and Example 3 (solid line). The front side is exposed to 900° C. with a Bunsen burner (horizontal).
Figure 4:
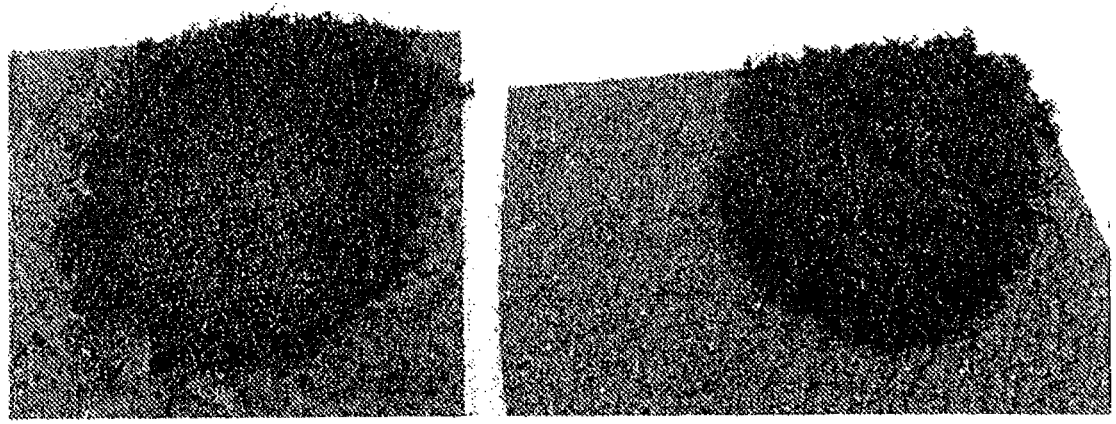
FIG. 4: The right-hand picture shows a stable expanded graphite foam as obtained with a fire-protection layer according to Examples 1 and 2.

The foam is stable, and when exposed to a flame, only minor particles become detached from the foam, caused by the thermal. When exposed to a temperature of 900° C. on the front side, a temperature of only about 280° C. can be measured on the back side.

The left-hand picture shows a foam as formed with a coating according to Example 3.

The foam is less stable, and when exposed to a flame, almost all particles become detached from the foam, caused by the thermal. When exposed to a temperature of 900° C. on the front side, a temperature of about 550° C. can be measured on the back side.

EXAMPLES

The subject matter according to the invention is employed, in particular, if the fire protection regulations require a layer of hardly inflammable insulation material, or if a hardly inflammable cover layer is to protect a product from fire propagation.

For example, a PU heat insulation board with the cover layer according to the invention can achieve building material class B1 according to DIN 4102-1, or fall into class B or C according to DIN EN 13501-1.

Example 1

Structure of a back layer according to the invention comprising a reinforcing layer, decoupling layer, and fire-protection layer:

An exemplary structure of a back layer according to the invention exhibits the following base weights for the individual layers:

Reinforcing layer: 290 g/m$^2$
Decoupling layer: glass fiber mat 70 g/m$^2$
Fire-protection layer with expandable graphite: 280 g/m$^2$ The compositions of the individual layers are described in more detail in the following:

1. Composition of a reinforcing layer

| Component | % by weight |
|---|---|
| Styrene/butadiene binder (DOW XZ 92087) | 4.74% |
| Aluminum hydroxide[1] | 10.82% |
| Calcium carbonate | 82.54% |
| Zinc stearate | 0.88% |
| Hydroxyethylcellulose (Tylose 100000 YP2) | 0.85% |
| Further components (wetting agents, defoamers, preservatives) | ad 100 |

[1]BET 4 m$^2$/g, D50 = 10 μm, density 0.95 kg/l

The composition of the reinforcing layer is suspended in water (solids content of the coating composition is 73%) and applied to the glass fiber mat (decoupling layer), and subsequently dried. The glass fiber mat has a base weight of 70 g/m$^2$ and a fiber thickness of 13 μm.

2. Composition of the fire-protection layer (Example 2)

| Component | % by weight | Explanation |
|---|---|---|
| Vinyl acetate/ethylene copolymer binder (Vinavil EVA 4612) | 20.91% | EVA binder |
| Styrene/acrylate (Makrovil D 343) | 1.55% | AC binder |
| Melamine cyanurate | 3.82% | Flame retardant |
| Ammonium polyphosphate (FR CROS 486 Silan) | 15.83% | Flame retardant APP |
| China clay (Chinafill 200) | 9.64% | China clay |
| ES 100 C10[2] | 6.37% | Expandable graphite, fine |
| ES 200 B8 DS[3] | 38.57% | Expandable graphite, coarse |
| Polyethylene oxide | 0.07% | Polyethylene oxide (slipping agent) |
| Polyurethane thickener (Borchi Gel 0435) | 0.76% | PU thickener |
| Acrylate thickener (Mirox VD 65) | 0.99% | Acrylate thickener |
| Further components (wetting agents, preservatives, defoamers, etc.) | ad 100% | |

[2]Particle size: D50 <150 μm
[3]Particle size: D50: 180-500 μm

The composition of the fire protection coating is suspended in water (solids content of the coating composition is 55%) and subsequently applied to the opposite side of the glass fiber mat, and subsequently dried.

The coating composition is pumped onto a non-woven and uniformly distributed using a doctor knife with an underlying roller (doctor knife/roller system).

3. Alternative composition of the fire protection layer (Example 3)

| Water | % by weight | Explanation |
|---|---|---|
| Vinyl acetate/ethylene copolymer binder (Vinavil EVA 4612) | 20.91% | EVA binder |
| Styrene/acrylate (Makrovil D 343) | 1.55% | AC binder |

3. Alternative composition of the fire protection layer (Example 3)

| Water | % by weight | Explanation |
| --- | --- | --- |
| MC 25 Slurry | 0% | Flame retardant melamine cyanurate |
| FR CROS 486 Silan | 0% | Flame retardant APP |
| Alfrimal 466 | 13% | Flame retardant ATH |
| Chinafill 200 | 9.64% | China clay |
| ES 100 C10 <150 | 6.37% | Expandable graphite, fine |
| ES 200 B8 DS | 38.57% | Expandable graphite, coarse |
| Slipping Agent | 0.07% | Polyethylene oxide (slipping agent) |
| Borchi Gel 0435 | 0.76% | PU thickener |
| Mirox VD 65 | 0.99% | Acrylate thickener |
| Further components (wetting agents, preservatives, defoamers, etc.) | ad 100% | |

We claim:

1. A multilayer heat insulation board for thermal insulation for buildings, comprising:
   a) a main layer (10) of thermally insulating organic-polymeric material having a first major surface and a second major surface opposite said first major surface;
   b) a reinforcing layer (20) having a first major surface and a second major surface opposite said first major surface, wherein said reinforcing layer (20) is bonded to the main layer (10) along the first major surface of the main layer and along the first major surface of the reinforcing layer, and wherein said reinforcing layer (20) contains inorganic salts in a quantity of at least 50% by weight, and 1.5 to 20% by weight of aluminum hydroxide (Al(OH)$_3$), based on the total weight of the reinforcing layer (20);
   c) a decoupling layer (30) having a first major surface and a second major surface opposite said first major surface, wherein said decoupling layer (30) is provided on and bonded to the second major surface of the reinforcing layer (20) with the first major surface of the decoupling layer, wherein said decoupling layer (30) comprises one or more fibers and/or non-wovens selected from the group consisting of glass-fiber mat, polyester non-woven, glass fabric mat, glass scrim mat, and glass fiber/polyester blend non-woven; and
   d) a fire-protection layer (40) provided on and bonded to the second major surface of the decoupling layer (30), said fire-protection layer (40) containing expandable graphite.

2. The multilayer heat insulation board according to claim 1, characterized in that the thermally insulating organic-polymeric material is selected from the group consisting of polyurethane, polyisocyanurate, polystyrene and phenol resin, and mixtures thereof.

3. The multilayer heat insulation board according to claim 1, characterized in that the decoupling layer (30) has a base weight of from 30 to 100 g/m$^2$.

4. The multilayer insulation board of claim 3 wherein the base weight of the decoupling layer is 40 to 90 g/m$^2$.

5. The multilayer insulation board of claim 4 wherein the base weight of the decoupling layer is 50 to 80 g/m$^2$.

6. The multilayer heat insulation board according to claim 1, characterized in that the fire-protection layer (40) contains expandable graphite in an amount of from 20 to 60% by weight based on the total weight of the fire-protection layer (40).

7. The multilayer insulation board of claim 6 wherein the expandable graphite is present in the fire-protection layer in an amount from 30 to 50% by weight, based on the total weight of the fire-protection layer.

8. The multilayer heat insulation board according to claim 1, characterized in that the fire-protection layer (40) further contains a polyphosphate in an amount of from 5 to 25% by weight, based on the total weight of the fire-protection layer (40).

9. The multilayer insulation board of claim 8 wherein the polyphosphate is present in the fire-protection layer in an amount from 10 to 20% by weight, based on the total weight of the fire-protection layer.

10. The multilayer heat insulation board according to claim 1, characterized in that the fire-protection layer (40) further contains melamine cyanurate in an amount of from 1 to 10% by weight, based on the total weight of the fire-protection layer (40).

11. The multilayer insulation board of claim 10 wherein melamine cyanurate is present in the fire-protection layer is present in an amount from 2 to 8% by weight, based on the total weight of the fire-protection layer.

12. The multilayer heat insulation board according to claim 1, characterized in that the fire-protection layer (40) further contains a binder.

13. The multilayer insulation board of claim 12 wherein the binder is an organic binder.

14. The multilayer insulation board of claim 1 wherein the amount of aluminum hydroxide in the reinforcing layer is 5 to 15% by weight based on the total weight of the reinforcing layer.

15. The multilayer insulation board of claim 14 wherein the amount of aluminum hydroxide in the reinforcing layer is 8 to 12% by weight based on the total weight of the reinforcing layer.

16. A multilayer heat insulation board for thermal insulation for buildings, comprising:
   a) a main layer (10) of thermally insulating organic-polymeric material having a first major surface and a second major surface opposite said first major surface;
   b) a reinforcing layer (20) having a first major surface and a second major surface opposite said first major surface, wherein said reinforcing layer (20) is bonded to the main layer (10) along the first major surface of the main layer and along the first major surface of the reinforcing layer, and wherein said reinforcing layer (20) contains inorganic salts in a quantity of at least 50% by weight, based on the total weight of the reinforcing layer (20);
   c) a decoupling layer (30) having a first major surface and a second major surface opposite said first major surface, wherein said decoupling layer (30) is provided on and bonded to the second major surface of the reinforcing layer (20) with the first major surface of the decoupling layer, wherein said decoupling layer (30) comprises one or more fibers and/or non-wovens selected from the group consisting of glass-fiber mat, polyester non-woven, glass fabric mat, glass scrim mat, and glass fiber/polyester blend non-woven; and
   d) a fire-protection layer (40) provided on and bonded to the second major surface of the decoupling layer (30), said fire-protection layer (40) containing expandable graphite and polyethylene oxide.

* * * * *